United States Patent Office 3,629,364
Patented Dec. 21, 1971

3,629,364
PHENOLIC RESIN COMPOSITIONS CONTAINING POLYMERS OF CYLIC ESTERS
Anthony C. Soldatos, Kendall Park, N.J., assignor to Union Carbide Corporation, New York, N.Y.
No Drawing. Filed Apr. 1, 1969, Ser. No. 812,321
Int. Cl. C08g 37/16
U.S. Cl. 260—838          18 Claims

ABSTRACT OF THE DISCLOSURE

This invention relates to phenolic resin composition, containing polymers of cyclic esters, which have excellent mold-release properties and are excellently suited for use in molding applications to form shaped articles of desired configuration characterized by excellent physical properties such as excellent toughness and excellent high temperature rigidity.

---

This invention relates to phenolic resin compositions containing a polymer of a cyclic ester. More particularly, this invention relates to phenolic resin compositions, containing a polymer of a cyclic ester, which have excellent mold-release properties, and are excellently suited for use in molding applications to form shaped articles of desired configurations, which are characterized by excellent toughness, manifested by resistivity to impact and by excellent rigidity at relatively high temperatures.

Phenolic resin compositions have found wide use, over the years, in molding applications wherein the compositions have been molded into shaped articles of desired configuration. One deficiency which has precluded even the wider use of phenolic resin compositions in molding applications has been the lack of toughness of these compositions, that is, these compositions, when in the form of shaped articles, have shown a tendency to shatter when subjected to an external impact.

In order to improve the toughness of phenolic resin compositions, it has been suggested to add thereto modifiers such as diene rubbers as for example, butaliene-1,3-acrylonitrile rubbers. These additives, however, although improving the toughness of the phenolic resin compositions, undesirably degrade the rigidity at elevated temperatures of these compositions. As a result, shaped articles produced from these compositions distort, that is, undergo undesirable dimensional changes when subjected to elevated temperatures.

The present invention provides phenolic resin compositions which are particularly desirable for use in the manufacture of molded articles characterized by excellent toughness and by excellent rigidity at relatively high temperatures. Also, the phenolic resin compositions of this invention have excellent mold-release properties which allows them to be successfully used in molding applications without the addition thereto of mold-release additives such as calcium stearate.

The compositions of this invention comprise a phenol-aldehyde condensate in admixture with a polymer of a cyclic ester wherein the polymer of a cyclic ester is present in an amount of about 1 percent by weight to about 50 percent by weight and preferably about 5 to about 25 percent by weight, based on the solids content of the phenol-aldehyde resin.

Particularly desirable phenolic-resin compositions for purposes of this invention are those containing, in addition to the polymer of a cyclic ester in amounts as described, about 1 to about 30 percent by weight and preferably about 5 percent to about 20 percent by weight of a cyclic ester monomer based on the combined weight of the monomer and the polymer of a cyclic ester. The addition of a cyclic monomer provides resultant compositions which are characterized by particularly desirable high temperature rigidity and toughness.

The solids content of the phenol-aldehyde resins is determined according to the following procedure, in those instances wherein the phenol-aldehyde resin is a liquid:

A 1.5 gram sample of the phenol-aldehyde resin is heated in an oven, which as at a temperature of 135° C., for three hours. The residue is then cooled to room temperature, i.e., 23° C. and weighed. The numerical weight of the residue is divided by the numerical weight of the sample and the result multiplied by 100. The result obtained represents the percent weight, on a solids basis, per 1.5 grams of liquid resin.

Suitable phenol-aldehyde resins, or more specifically suitable condensation products of a phenol and aldehyde, are the condensates, generally acid catalyzed, referred to as "novolac resins" and condensates, generally alkaline catalyzed referred to as "resole resins."

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle, grindable resins which can be converted to the infusible state by the addition thereto of a methylene generating agent such as hexamethylenetetramine.

Condensates generally referred to as "resole resins" are usually prepared by condensing a phenol and an aldehyde in the presence of a base such as an alkali metal oxide or hydroxide, as for example, sodium and potassium hydroxide, calcium hydroxide, calcium oxide and the like, or an amide, or ammonia; wherein the aldehyde is present in the reaction mixture in greater than stoichiometric amounts. The resoles can be either liquid resins, soft resins having a low melting point or hard, brittle, grindable resins and are heat-hardenable per se to the infusible state, that is, they will thermoset to infusible products under the influence of heat.

Illustrative of suitable phenols which can be condensed with an aldehyde to produce suitable phenol-aldehyde resins are the monohydric as well as the polyhydric phenols.

Among suitable monohydric phenols can be noted; phenol, and those phenols having the general formula:

Formula I

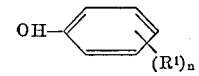

wherein $n$ is an integer having a value of 1 to 2 inclusive, each $R^1$, which can be the same or different, is an alkyl radical containing from 1 to 6 carbon atoms inclusive, an alkoxy radical containing from 1 to 6 carbon atoms inclusive, or a halogen, i.e., chlorine, bromine, iodine, and fluorine; with the proviso that at least 3 positions other than meta to the hydroxyl group are unsubstituted.

Specific phenols falling within the scope of Formula I are: alkylated phenols, exemplary of which are m-cresol, o - ethylphenol, m - propylphenol, m - isopropylphenol, m-sec-butylphenol, m-amylphenol, m-n-hexylphenol, 3,5-dimethylphenol, 3,5-diethylphenol, 3,5-di-n-hexylphenol, and other like phenols, as well as the commercially available meta-cresol which contains small amounts of both the para and the ortho isomers; alkoxylated phenols, exemplary of which are m-methoxyphenol, m-ethoxyphenol, m-propoxyphenol, m - n - hexoxyphenol, 3,5-dimethoxyphenol, and the like: halogenated phenols such as meta chlorophenol, and m-bromophenol. Also suitable are cycloalkenylphenols such as p - cyclopentenylphenol, p-cyclohexenylphenol and the like.

Among suitable polyhydric phenols can be noted resorcinol, catechol and the like, as well as polyhydric, polynuclear phenols having the formula:

Formula II

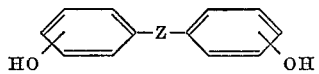

wherein Z is a divalent radical, as for example, sulfur, oxygen, alkylidene, alkylene and the like; as well as substituted derivatives of phenols falling within the scope of Formula II.

Exemplary of specific polyhydric, polynuclear phenols are the following: bis(hydroxyphenyl)alkanes such as 2,2-bis-p-hydroxyphenyl)propane, commonly referred to as Bisphenol A, 2,4'-dihydroxydiphenylmethane, bis(2-hydroxyphenyl)methane, bis(4-hydroxyphenyl)methane, 1,1-bis(4-hydroxyphenyl)ethane, 1,2-bis(4-hydroxyphenyl) ethane, 1,1-bis(4-hydroxy-2-methylphenyl)ethane, 2,2-bis (2-isopropyl-4-hydroxyphenyl)propane, 2,2 - bis(4 - hydroxyphenyl)-pentane, 3,3-bis(4-hydroxyphenyl)pentane, 2,2 - bis(4-hydroxyphenyl)heptane, bis(4 - hydroxyphenyl)phenylmethane, bis(4-hydroxyphenyl)cyclohexylmethane, 1,2-bis(4-hydroxyphenyl) - 1,2-bis(phenyl)propane, 2,2-bis(4 - hydroxyphenyl) - 1 - phenylpropane and the like; dihydroxy biphenyls such as 4,4'-dihydroxybiphenyl, 2,2'-dihydroxybiphenyl, 2,4'-dihydroxybiphenyl and the like; di(hydroxyphenyl)sulfones such as bis(4-hydroxyphenyl)sulfone, 2,4'-dihydroxydiphenylsulfone, and the like; di(hydroxyphenyl)ethers such as bis(4-hydroxyphenyl)ether and the like.

Examples of aldehydes which can be condensed with the phenols listed above to produce the phenol-aldehyde resins are: formaldehyde in any of its available forms, i.e., formalin and para-formaldehyde; furfural and the like.

For a detailed discussion of condenates produced from a phenol and an aldehyde and methods for the production thereof, reference is made to the books: "Phenoplasts" by T. S. Carswell, published in 1947 by Interscience Publishers and "Chemie der Phenolharze" by K. Hultzsch, Springer Verlag 1950, which are incorporated herein by reference.

Polymers of cyclic esters which are contemplated in the practice of this invention are those which posses a reduced viscosity of at least about 0.1 preferably about 0.15 to about 15 and higher. The preferred polymers of cyclic esters have a reduced viscosity of about 0.3 to about 10.

Suitable polymers are further characterized by the following recurring structural Unit I:

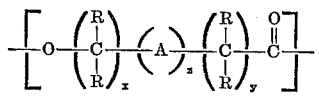

wherein each R, which can be the same or different, is hydrogen, halogen, i.e., chlorine, bromine, iodine or fluorine, or a monovalent hydrocarbon radical generally containing a maximum of 12 carbon atoms and preferably containing a maximum of 8 carbon atoms; A is an oxy group; $x$ is an integer having a value of 1 to 4 inclusive; $y$ is an integer having a value of 1 to 4 inclusive; $z$ is an integer having a value of 0 or one; with the provisos that (a) the sum of $x+y+z$ is 4 to 6 inclusive and (b) the total number of R variables which are substituents other than hydrogen does not exceed 3 and preferably does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexy, n-dodecyl, chloroethyl, chloropropyl and the like; alkoxy radicals such as methoxy, ethoxy, n-propoxy, n-hexoxy, n-dodecoxy and the like; aryl radicals such as phenyl, ethylphenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters which are contemplated are characterized by both recurring structural Unit I supra and recurring structural Unit II:

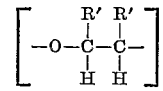

wherein each R', is as defined for R of Unit I or in which the two R' variables together with the ethylene moiety of the oxyethylene chain of Unit II form a saturated cycloaliphatic hydrocarbon ring having from 4 to 8 carbon atoms inclusive, preferably from 5 to 6 carbon atoms inclusive. It is preferred that recurring Unit II contains from 2 to 12 carbon atoms inclusive.

The aforedescribed recurring Unit I is interconnected through the oxy group (—O—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infra-red analysis which factor is readily understandable since macromolecules are involved. On the other hand, the relatively low molecular weight cyclic ester polymers, e.g., those having reduced viscosity values below about 0.3 are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. It may be desirable to convert the hydroxyl and carboxyl end groups, if present, by esterification or acylation techniques by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic comonomer which is coopolymerizable therewith, e.g., as alkylene oxide, the polymeric chain of the resulting copolymeric product will be characterized by both recurring Unit I supra as well as the recurring Unit II (which would represent the alkylene oxide comonomer polymerized therein). The interconnection of Unit I and Unit II supra does not involve or result in the direct bonding of two oxy groups, i.e., —O—O—. In other words, the oxy group (—O—) of recurring Unit II is interconnected with the carbonyl group

of recurring Unit I supra or with the alkylene moiety of a second oxyalkylene Unit II.

Particularly preferred polymers of cyclic esters are those which are characterized by the oxypentamethylenecarbonyl chain as seen in recurring structural Unit III:

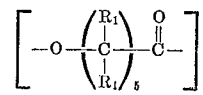

wherein each $R_1$ is hydrogen or lower alkyl, that is alkyl having a maximum of 4 carbon atoms, preferably hydrogen or methyl, with the proviso that no more than three $R_1$ variables are substituents other than hydrogen.

The preparation of the cyclic ester polymers are well documented in the patent literature as exemplified by U.S. Pats. Nos. 3,021,309 through 3,021,317; 3,169,945; and 2,962,524. Briefly, the process involves the polymerization of an admixture containing at least one cyclic ester monomer with or without a functional initiator therefor, and a suitable catalyst, the choice of which will depend on the presence or absence of added initiator.

Suitable monomeric cyclic esters which can be employed in the manufacture of the cyclic ester polymers are best illustrated by the following formula:

Formula III

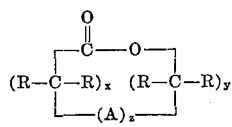

wherein the R, A, $x$, $y$, and $z$ variables have the significance noted in Unit I supra.

Particularly desirable cyclic esters which can be employed in the manufacture of the cyclic ester polymers are those having the formula:

Formula IV

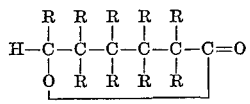

wherein R is as previously defined and at least six R's are hydrogen.

Representative monomeric cyclic esters which are contemplated include, for example, delta-valerolactone; epsilon-caprolactone; zeta-enantholactone; the monoalkyl-delta-valerolactones, e.g., the monomethyl-, monoethyl-, monohexyl-, delta-valerolactones, and the like; the dialkyldelta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., the monomethoxy-, monoisopropoxy-, dimethoxy-, and diethoxy- delta-valerolactones and epsilon-caprolactones.

Among specific ε caprolactones falling within the scope of Formula IV can be noted: ε-caprolactone, β-methyl-ε caprolactone, γ-methyl-ε caprolactone, δ-methyl-ε caprolactone, ε-methyl-ε caprolactone, β,δ-dimethyl-ε caprolactone, β-chloro-ε caprolactone, γ-ethoxy-ε caprolactone, ε-phenyl-ε caprolactone and the like.

A single cyclic ester monomer or mixtures of such monomers can be employed, if so desired.

In the absence of added functional initiator, the polymerization process is desirably effected under the operative conditions and in the presence of anionic catalysts as noted in U.S. 3,021,309 to U.S. 3,021,317 such as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pats. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-groups. Carboxyl substituents on the initiator will result in polymeric products having carboxyl end-groups. The initiator sans the active hydrogen atom will thus be contained in the final polymeric molecule. The esterification or acylation of the aforementioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula:

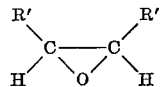

wherein each R′, individually, have the meanings noted in Unit II supra, can be reacted with a polyfunctional initiator possessing amino, hydroxyl, and/or carboxyl groups, preferably in the presence of a Lewis acid catalyst such as boron trifluoride. The resulting polymeric products have hydroxyl termination which can be converted to acyloxy or hydrocarbyloxy moieties by conventional techniques. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0) in the presence of an inert normally-liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

As mentioned previously, the polymers of cyclic esters which are contemplated are expressed in terms of their reduced viscosity values. As is well known in the art, reduced viscosity value is a measure of indication of the molecular weight of polymers. The expression "reduced viscosity" is the value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30° C.

It is to be noted that mixtures of phenolic resins and/or polymers of cyclic esters can be used.

Also, the disclosure of all references noted in this application are incorporated herein by reference.

The compositions of this invention based on phenolic-resins and polymers of cyclic esters can be formulated by a number of convenient methods. As an illustration, the phenol-aldehyde condensate, and the polymer of a cyclic ester, with or without other modifiers, can be blended on a two-roll mill, in a Banbury mill or other such suitable apparatus.

In those instances wherein a monomeric cyclic ester is used, it is convenient to blend the monomeric cyclic ester with the polymer of the cyclic ester on a two-roll mill and to then blend the mixture with the phenol-aldehyde condensate in a manner as described.

When the condensate of a phenol and an aldehyde which is to be used in accordance with this invention is a so-called novolac resin, it is customary to add to the composition a methylene-generating compound which will insure that the composition, when heated, will thermoset to an infusible product. Illustrative of such methylene generating compounds are hexamethylenetetramine, anhydro-formaldehyde-aniline, paraform and the like. A discussion of suitable methylene-generating compounds is to be found in the book by T. S. Carswell previously noted.

When used, the methylene-generating compounds are employed in amounts of from about 5 percent by weight to about 20 percent by weight, preferably about 10 percent by weight based on the weight of the condensate of a phenol and an aldehyde. More than 20 percent by weight can be used but this is economically undesirable.

Also, if so desired, any of the conventional catalysts used to promote the thermosetting of phenolic resins can be used, in all instances, as an aid in thermosetting compositions of this invention. These catalysts, when employed, are used in amounts of from about 1 percent by weight to about 20 percent by weight, preferably from about 2 percent by weight to about 6 percent by weight based on the weight of the condensate of a phenol and an aldehyde. Exemplary of such catalysts are the alkali metal hydroxides such as sodium hydroxide, potassium hydroxide and the like; the alkaline earth metal hydroxides such as calcium hydroxide and the like; alkaline earth metal oxides such as calcium oxide and the like.

Compositions of this invention can also contain various other additives, as are well known in the art. Illustrative of such additives, are the so-called fillers which are inert materials usually added to phenolic resin compositions in order to improve the physical characteristics thereof. Illustrative of such fillers are the following: the mineral fillers such as asbestos, wollastonite, mica, silica, graphite, and the like; and organic fillers such as woodflour, cotton flock, polyamide fibers, polyester fibers, graphite cloth, graphite fibers and the like.

Fillers, when used, are generally employed in amounts of from about 15 percent by weight to about 300 percent by weight based on the weight of the condensate of a phenol and an aldehyde.

Other materials commonly added to phenolic resin compositions are colorants such as titanium dioxide and the like.

The addition of lubricants commonly used with phenolic resins as mold-release agents is not necessary with respect to compositions of this invention. As stated, the compositions of this invention have excellent mold-release properties.

Also, as perviously pointed out, the compositions of this invention have particular utility as compositions which can be molded into articles of desired shape. The exact conditions under which compositions of this invention can be molded will, of course, vary depending, in part, upon the particular composition being molded and the configuration and size of the article being formed. As a general rule, suitable molding temperatures range from about 150° C. to about 200° C.

In the example noted below, the phenol-aldehyde resins were prepared as follows:

PHENOL-ALDEHYDE RESOLE RESIN

Into a still there was charged 150 parts by weight of formalin (37%) and 100 parts by weight phenol. Three parts by weight sodium hydroxide were then added and the contents in the still brought to a temperature of 80° C. and maintained at this temperature for 2 hours while under a pressure of 330 mm. of Hg. At the end of the two hour period, the contents of the still were neutralized and then brought to a pH of 3.50 to 4.50 by the addition thereto of boric acid (75%). The contents of the still were vacuum dehydrated up to a temperature of about 80° C. to about 100° C. under a pressure of about 75 mm. of Hg. The resole resin so obtained was discharged into a pan and cooled to room temperature, about 23° C. The resin was grindable and heat-hardenable, that is, capable of thermosetting to an infusible product.

PHENOL-ALDEHYDE NOVOLAC RESIN

One hundred parts by weight phenol and 73 parts by weight formalin (37%) were admixed in a still and the pH thereof adjusted to 1.0–1.1 by the addition thereto of oxalic acid. The mixture was then vacuum refluxed at a temperature of 90° C. to cloudiness. The temperature was gradually increased to 120° C. by the steady increase of pressure and reflux was continued for two hours at a temperature of 120° C. At the end of this two hour period, pressure was released and the system dehydrated until the residue temperature reached 160° C. The novolac resin so produced was discharged into a pan and air cooled to room temperature about 23° C. The resin was hard and grindable.

Polycaprolactone A—was a homopolymer of ε caprolactone having a molecular weight of about 10,000 and a reduced viscosity of 0.3.

Polycaprolactone B—was a homopolymer of ε caprolactone having a molecular weight of about 10,000 and a reduced viscosity of 0.3 to which had been added 15 percent by weight ε caprolactone monomer based on the weight of the polycaprolactone and ε caprolactone.

Compositions, the formulations of which are noted in the table below in parts by weight, were compounded to a blend on a two-roll mill, the front roll of which was at a temperature of 95° C. and the back roll of which was at a temperature of 150° C.

|  | Control 1 | Composition A | Composition B |
|---|---|---|---|
| Parts by weight: | | | |
| Phenol-formaldehyde resole resin | 36.75 | 36.75 | 36.75 |
| Phenol-formaldehyde novolac resin | 6.25 | 6.25 | 6.25 |
| Polycaprolactone A | | 5.00 | |
| Polycaprolactone B | | | 5.00 |
| Cotton flock | 9.00 | 9.00 | 9.00 |
| Wood flour | 11.25 | 11.25 | 11.25 |
| Asbestos | 21.50 | 21.50 | 21.50 |
| Nigrosine | 1.80 | 1.80 | 1.80 |
| Ca(OH)$_2$ | 1.00 | 1.00 | 1.00 |
| Clay | 0.60 | 0.60 | 0.60 |
| Calcium stearate | 3.00 | | |
| Ball drop test (measure of impact resistance), inches | 35.5 | 47 | 40 |
| AMOE (measure of rigidity at elevated temperatures), p.s.i. | 53,000 | | 55,000 |
| Mold and flash release (measure of mold release properties) | Good | Good | Good |

BALL DROP TEST

Standard ASTM cups, two inches in diameter, were molded at a temperature of 335° F. under a pressure of about 2500 using a 2 minute molding cycle. The cups were allowed to cool to room temperature and then placed under the path of a raised 25 gram steel ball. The cups were struck with the ball, which was positioned at measured distances away from the cups until the cups shattered. The distance of each shattered cup, from the top of the trajectory of the steel ball was noted in inches.

AMOE—apparent modulus of elasticity—was carried out by molding a bar ⅛ inch by 1 inch by 5 inches at 335° F. under a molding cycle of 75 seconds, at 2000 p.s.i. pressure. The bar was then discharged directly into a flexural test jig affixed to the molding press, and the stress-strain flexural curve obtained utilizing a 300 gram weight. The slope of the stress-strain flexural curve is reported as AMOE.

Mold and flash release—cups were molded as described in the Ball Drop Test and the ease by which the cups released from the mold on being manually removed, noted and described as good, when the cups released easily and poor, when the cups stuck to the walls of the mold.

Comparable results are achieved using polymers of the following lactones:

1-δ-valerolactone
2-γ-methyl-ε-caprolactone

As states, the compositions of this invention can be molded into articles of desired shape. Specific articles are handles for household appliances, agitator blades for washing machines and the like.

What is claimed is:

1. A phenolic composition comprising a phenolaldehyde condensate and a polymer of a cyclic ester having a reduced viscosity of at least about 0.1 and consisting essentially of recurring units having the formula:

$$\left[ O-\left(\underset{R}{\overset{R}{C}}\right)_x-(A)_z-\left(\underset{R}{\overset{R}{C}}\right)_y-\overset{O}{\underset{}{C}} \right]$$

wherein R is hydrogen, halogen or a monovalent hydrocarbon radical containing a maximum of 12 carbon atoms, A is an oxy group; $x$ is an integer having a value of 1 to 4 inclusive; $y$ is an integer having a value of 1 to 4 inclusive; $z$ is an integer having a value of 0 or one; with the provisos that (a) the sum of $x+y+z$ is 4 to 6 inclusive and (b) the total number of R variables which are substituents other than hydrogen does not exceed 3, wherein said polymer of a cyclic ester is present in an amount of about 1 to about 50 percent by weight.

2. A composition as defined in claim 1 wherein said polymer of a cyclic ester has a reduced viscosity of about 0.15 to about 15.

3. A composition as defined in claim 1 wherein R is hydrogen and $z$ is an integer having a value of 0.

4. A composition as defined in claim 1 wherein said polymer of a cyclic ester is present in an amount of about 5 percent to about 25 percent by weight.

5. A composition as defined in claim 1 wherein the phenolic component of the phenol-aldehyde condensate is phenol.

6. A composition as defined in claim 1 wherein the aldehyde is formaldehyde.

7. A composition as defined in claim 1 wherein the phenol-aldehyde condensate is a phenol-formaldehyde novolac resin.

8. A composition as defined in claim 7 wherein the composition contains a methylene generating compound.

9. A composition as defined in claim 8 wherein the methylene generating compound is hexamethylenetetramine.

10. A composition as defined in claim 1 wherein the phenol-aldehyde condensate is a phenol-formaldehyde resole resin.

11. The thermoset product of the composition defined in claim 1.

12. A composition as defined in claim 1 containing a monomeric cyclic ester having the formula:

$$\begin{array}{c} O \\ \parallel \\ C-O \\ (R-C-R)_x \quad (R-C-R)_y \\ (A)_z \end{array}$$

wherein R, A, $x$, $y$, and $z$ are as defined in claim 1 wherein said monomeric cyclic ester is present in an amount of about 1 to about 30 percent by weight.

13. A composition as defined in claim 12 wherein the monomeric cyclic ester has the formula:

$$\left[ \begin{array}{c} R \; R \; R \; R \; R \\ H-C-C-C-C-C=O \\ O \; R \; R \; R \; R \end{array} \right]$$

wherein R is as defined in claim 12 with at least six R's being hydrogen.

14. A composition as defined in claim 13 wherein all R's are hydrogen.

15. A composition as defined in claim 1 wherein the polymer of a cyclic ester consists essentially of recurring units having the formula:

$$\left[ O-\left(\underset{R_1}{\overset{R_1}{C}}\right)_5-\overset{O}{\underset{}{C}} \right]$$

wherein each $R_1$ is hydrogen or lower alkyl.

16. A composition as defined in claim 15 wherein each $R_1$ is hydrogen.

17. A composition as defined in claim 15 wherein each $R_1$ is lower alkyl.

18. A phenolic composition comprising a phenol-aldehyde condensate and a polymer of a cyclic ester having a reduced viscosity of at least about 0.1 and consisting essentially of recurring units I and minor amounts of recurring units II below:

I
$$\left[ O-\left(\underset{R}{\overset{R}{C}}\right)_x-(A)_z-\left(\underset{R}{\overset{R}{C}}\right)_y-\overset{O}{\underset{}{C}} \right]$$

wherein R is hydrogen, halogen or a monovalent hydrocarbon radical containing a maximum of 12 carbon atoms, A is an oxy group; $x$ is an integer having a value of 1 to 4 inclusive; $y$ is an integer having a value of 1 to 4 inclusive; $z$ is an integer having a value of 0 or one; with the provisos that (a) the sum of $x+y+z$ is 4 to 6 inclusive and (b) the total number of R variables which are substituents other than hydrogen does not exceed 3;

II
$$\left[ O-\underset{H}{\overset{R'}{C}}-\underset{H}{\overset{R'}{C}} \right]$$

wherein each R' is as defined for R above or wherein the two R''s together with the ethylene moiety form a saturated hydrocarbon ring having from 4 to 8 carbon atoms inclusive, wherein said polymer of a cyclic ester is present in an amount of about 1 to about 50 percent by weight.

References Cited

UNITED STATES PATENTS 2,489,711   11/1949   Jayne et al. _____ 260—842
3,278,557   10/1966   Chibnik _____ 260—838

JOHN C. BLEUTGE, Primary Examiner

U.S. Cl. X.R.

260—17.2, 38, 78.3, 841, 842, 874, 901